5

United States Patent Office 3,759,854
Patented Sept. 18, 1973

3,759,854
POLYESTER POWDER COATING COMPOSITIONS
Wen-Hsuan Chang and Rostyslaw Dowbenko, Gibsonia, and Joseph M. Makhlouf, Mars, Pa., assignors to PPG Industries, Inc., Pittsburgh, Pa.
No Drawing. Filed Jan. 27, 1972, Ser. No. 221,406
Int. Cl. C09d 3/52, 3/66
U.S. Cl. 260—21
10 Claims

ABSTRACT OF THE DISCLOSURE

Powder coatings can be formulated from thermosetting polyester resins and a crosslinking agent, such as a condensation product of aldehydes with melamine, urea, or benzoguanamine. Such powder compositions when applied by fluidized bed, electrostatic fluidized bed or electrostatic spray provide for coatings that have particularly good exterior weatherability, good electrical insulation properties, even at high temperature, and good resistance to abrasion.

BACKGROUND OF THE INVENTION

In recent years the powder coatings industry has shown phenomenal growth. In essence, powder coatings are dry coating compositions. Such compositions cause no solvent pollution, permit essentially total material use and offer excellent coating characteristics as well as provide for substantial economic savings. These compositions can be applied by dip or spray, conventionally or electrostatically, and are without need of solvents as carriers. In addition, these compositions are substantially odor-free and no by-products need be purged from the system. Other advantages gained by employing powder compositions include simplicity of application equipment, ease of training technical personnel, and the ability to obtain thick films. Likewise, those characteristics associated with conventional coatings such as sags, runs, peels, and popping have substantially been eliminated.

Powders which have been employed successfully include vinyls, nylons, cellulosics, chlorinated polyethers, polyethylenes, epoxies, acrylics. These powders have their disadvantages as well as their advantages, for example, vinyls, although having good resilience and impact resistance, require a primer in order to promote good adhesion; nylons are quite expensive and nearly always require a primer; cellulosics have a low heat distortion point and poor adhesion; chlorinated polyethers have only fair weatherability and are expensive; polyethylene adhesions is very poor; and epoxies have low ultraviolet resistance and tend to chalk and lose gloss in exterior applications.

DESCRIPTION OF THE INVENTION

Now it has been discovered that powder coating compositions can be formulated from thermosetting polyester resins and a suitable crosslinking agent. More particularly, this invention relates to a method of producing an essentially 100 percent powder coating composition comprising reacting a polyester resin with a crosslinking resin such as a condensation product of an aldehyde with melamine, urea or benzoguanamine. Such compositions, when baked, provide for coatings that are both protective and decorative, and have excellent exterior weatherability and good electrical insulation properties.

The polyester resin that is utilized in this invention can be on an oil-modified polyester, an oil-free polyester, saturated polyester, unsaturated polyester, imide-modified polyester or an oil-free polyester thinned in reactive monomers.

The expression oil-modified polyester resins is understood to mean mixed polyesters that are obtained by condensation of di- or polycarboxylic acids and/or their anhydrides, saturated and/or unsaturated fatty acids, and one or more polyols incorporated in molar excess. As the di- or polycarboxylic acids, it is preferred to use phthalic acid or phthalic anhydrides are also suitable, as, for example, isophthalic acid, terephthalic acid, tetra- and hexahydrodrophthalic acid, tetrachlorophthalic acid, hexachloroendo-methylene-tetrahydro-phthalic acid, endomethylene-tetrahydrophthalic acid, trimellitic acid, as well as adipic and sebacic acid. In addition to these polycarboxylic acids, it is possible to use, at least in part, unsaturated dicarboxylic acids or their anhydrides such as maleic acid, maleic anhydride, fumaric acid, itaconic acid citraconic acid, mesaconic acid, and the like.

The broad definition of saturated and unsaturated fatty acids is understood to encompass all straight chain or branched chain compounds or mixtures produced synthetically or occurring in natural products, that have between 6 and 22 carbon atoms per molecule.

Examples of suitable fatty acids are the following: caproic acid, caprylic acid, capric acid, lauric acid, myristic acid, palmitic acid, margaric acid, stearic, acid, arachic acid, behenic acid, lignoceric acid, palmitolic acid, petroselinic acid, oleic acid, elaidic acid, erucic acid, 9,12-linolei acid, linolenic acid, arachidic acid, clupanodonic acid, sorbic acid, 9,11-linoleic acid (dehydrated caster oil fatty acid), a-elaeo-stearic acid, a-licanic acid, a-parinaric acid, riconoleic acid, 9,10 - dihydroxystearic acid and isanolic acid; also isomer mixtures of various isooctane and isononane acid, as, for example, 3,3,5-trimethylhexanoic, 3,4-dimethyl-1-hexanoic acid, 3,5-dimethyl-1-hexanoic acid, 4,5-dimethylhexanoic acid, which are obtained by oxo-synthesis from branched olefins.

Suitable polyols include di-, tri-, tetra- and higher valent compounds. Preferred are the tri- and tetravalent alcohols. However, it is possible to also use mixtures of di- and trivalent polyalcohols. More particularly, the following alcohols are suitable: ethylene glycols, propanediol-1,2, butanediol-1,3, butanediol-,1,4, diethylene glycol, dipropylene glycol and their higher homologues, neopentyl glycol, 2,2,4-trimethylpentanediol, pentanediol-1,5, hydroxyalkylated bisphenols, dimethylolcyclohexane, glycerin, trimethylolethane, trimethylolpropane, 2,2 - dimethylolbutanol-3, hexanetriol-1,2,6, pentaerythritol and its homologues formed by etherification, such as di- and tripentaerythritol, tetramethylolcyclohexanol, mannite, sorbite and a methylglucoside.

In the preparation of the oil-modified polyester resins, it is possible to replace the saturated and/or unsaturated fatty acids with other monocarboxylic acids and thus further modify the properties of the end groups. Suitable monocarboxylic acids are for example: natural resin acids such as abietic acid, neobietic acid, laevoprimaric acid, hydrogenated and partially hydrogenated resin acids, such as dihydro- and tetrahydroabietic acid, also benzoic acid and p-tert-butylbenzoic acid as well as technical mixtures of fatty and resinic acids known by the name of tall oil.

The preparation of the oil-modified polyester resin can be carried out by either the use of the free fatty acids or by reesterifying the natural oils and fats, in a first step, with an equivalent quantity of polyalcohol to form the monoglycerides and then, after adding the polycarboxylic acid, completing the polycondensation. The reesterification is suitably carried out in the presence of catalysts. Suitable catalysts are: lithium ricinoleate, sodium alkoxides, such as sodium mettioxide, lead oxide, zinc oxide and zinc acetate, calcium oxide and calcium acetate.

In the preparation of the oil-modified polyester resins in accordance with the re-esterification process, it is possible to use non-drying, half-drying and drying fatty oils and fats such as peanut oil, coconut oil, palm-kernel oil, palm oil, castor oil, hemp oil, cottonseed oil, safflower oil, soy bean oil, sunflower oil, linseed oil, wood oil, oiticica oil, perilla oil and fish oils.

Oil-free polyesters comprised of polyhydric alcohols and polybasic acids can also be used. Among the suitable alcohols and acids are included the polyols and acids described hereinabove. Some of the more commonly employed polyols include diethylene glycol, dipropylene glycol, trimethylolpropane, glycerol, 2-methyl-2-ethyl-1,3-propanediol, 2 - ethyl-1,3-hexanediol, 2,2-diethyl-1,3-propanediol, and the like. Some of the more commonly employed polycarboxylic acids are succinic acid, glutaric acid, adipic acid, pimelic acid, azelaic acid, sebacic acid, aromatic polycarboxylic acid, such as phthalic acid, isophthalic acid, tetrahydrophthalic acid, and the like. The term acid as used herein includes the corresponding anhydrides when such anhydrides exist.

Unsaturated polyesters are those polyesters that have some degree of unsaturation. The unsaturation may be readily introduced by employing unsaturated polycarboxylic acids and/or unsaturated fatty acids.

Amide-modified oil-free polyesters are those polyesters which have part of the ester linkages replaced with amidic linkages by substituting an amide of glycerylmonoamine for part or all of the fatty acid normally used and can be readily employed in the invention herein. Likewise, oil-free polyesters which have been thinned in reactive monomers may be employed. For example, reactive monomers such as 2,2-dimethyl-3-hydroxypropyl-2,2-dimethyl-3-hydroxypropionate, dimethylol propionic acid, hydrogenated Bisphenol A, 1,6-hexanediol and the like.

The above-described polyesters are prepared by an esterification procedure well known in the art. The requisite equipment is a vesesl which can be heated and is equipped with an agitator, reflux condenser, and a temperature measuring device. The esterification may be conducted in an apparatus similar to that illustrated by U.S. Pat. 2,993,029. The reaction temperatures mentioned in the patent are applicable here as well, that is, temperatures of about 350° F. to about 450° F. are generally utilized in the preparation of the polyesters that may be employed in this invention. Generally, an esterification catalyst is employed such as inorganic tin salts, that is, stannous halides, stannous acrylates, and stannous alkoxides, and stannic salts, and organic tin compounds have been found to be particularly effective. The following compounds are illustrative: stannous hydroxides, stannous bromide, stannous chloride, stannous iodide, stannous sulfate, stannous acetate, stannic chloride, stannic bromide, dibutyltin diacetate, dibutyltin dilaurate, dibutyltin maleate, dibutyltin dichloride, dibutyltin oxide, dioctyltin oxide, trimethyltin hydroxide, tributyltin hydroxide and the like.

Various reactive functional materials which may be used to modify the polyester described above include nitrocellulose, phenolic resins, chlorinated rubber, vinyl resins, chlorinated paraffin, epoxy resins, polyisocyanates, silicones, cellulose acetobutyrate, polyamide resins, natural resins and the like.

Among essential component of the powdered coating composition is an amine-aldehyde resin, i.e., an aldehyde condensation product of melamine, urea, acetoguanamine, or a similar compound. Generally, the aldehyde employed is formaldehyde, although the products can be made from other aldehydes, such as acetaldehyde, crotonaldehyde, acrolein, benzaldehyde, furfural, and others. While resins produced from melamine or urea are most common and are preferred, condensation products of other amines and amides can also be employed, those of triazines, diazines, triazoles, guanidines, guanamines, and alkyl and aryl substituted derivatives of such compounds, including alkyl and aryl substituted ureas and alkyl and aryl substituted melamine, provided at least one amino group is present. Some examples of such compounds are N,N'-dimethylurea, benzylurea, dicyanidamide, formoguanamine, benzoguanamine, ammeline, 2-chloro-4,6-diamino-1,3,5-triazine, 6 - methyl-2,4-diamino-1,3,5-triazine, 2-phenyl-4-amino-6-hydroxy-1,3,5-triazine, 3,5 - diaminotriazole, triaminopyrimidine, 2-mercapto-4,6-diamino pyrimidine, 2,4,6-trihydrazine-1,2,5-triazine, 2,4,6-triethyltriamine-1,3,5-triazine, 2,4,6-triphenyltriamino-1,3,5-triazine and the like, as well as, sulfonamide resins.

These aldehyde condensation products contain methylol or similar alkylol groups, the structure of the alkylol group depending upon the particular aldehyde employed. At least a portion, i.e., all or part, of these alkylol groups should be etherified by reaction with an alcohol. Any monohydric alcohol can be employed for this purpose, including such alcohols as methanol, ethanol, propanol, butanol, pentanol, hexanol, heptanol, and other alkanols, usually having up to about 12 carbon atoms, as well as benzyl alcohol and other aromatic alcohols; cyclic alcohols, such as cyclohexanol; monoethers of glycols, such as the Cellosolves and Carbitols; and halogen-substituted or other subsituted alcohols, such as 3-chloropropanol.

The amine-aldehyde resin is produced in a manner well known in the art, using acidic or basic catalysts and varying conditions of time and temperature in accordance with conventional practice. The formaldehyde is often employed as a solution in water or alcohol, and the condensation, etherification and polymerization reactions may be carried out either sequentially or simultaneously.

The particular proportion of the polyester resin and the amine-aldehyde resin is not critical, however, for purposes of this invention, from 1 percent to about 50 percent by weight of the reaction product may be comprised of the amine-aldehyde, such percentages provide for coating compositions that are useful for many purposes. Reaction products comprising from about 5 percent to about 20 percent by weight of an amine-aldehyde resin provide for the most useful coating compositions.

The conditions for reacting the polyester and amine-aldehyde resin are also somewhat flexible and are somewhat dependent upon the reactivity of the components employed. However, for purposes of this invention, it is preferred that the reaction has proceeded to a point that when the reaction is terminated the "softening point" will remain at least 65° C. or above. However, the final powder should have sufficient reactivity that the powder particles will fuse when heated. "Softening point" as defined herein means that temperature above which the powder particles cease to flow freely and begin to agglomerate in a period of several minutes. Thus, to provide powders having desirable stability, it is necessary that they have a softening point of at least 65° C.

Usually the polyester is added to the heating vessel and heated to a temperature above its melting point, and while in a molten state the crosslinking agent is added thereto, but in some instances the polyester and crosslinking agent may be heated up together when desirable. The reaction will be permitted to continue until the softening point of the reaction product has reached at least 65° C. and finally the reaction product is poured into cooling pans.

In general, the coating powder compositions of this invention are produced by comminution of the resinous reaction product. One means of comminution employs grinding or grading the reaction product at room temperature. The particle size may vary widely and, in general, is governed mainly by the process equipment and the product to be formed. The lower limit of particle size is kept sufficiently large to avoid dusting, and the upper limit is sufficiently small to avoid uneven buildup of the coating on the article. Usually the particle size is from about 25 to 90 microns, however, the preferred size is from about 50 to 75 microns. Then, after application of the comminuted material to an article, the said article is heated to a temperature so that the powder coating fuses and provides for a hard resinous film.

In some instances the object may be heated and immersed in a fluidized bed of the powder, or by rolling the object in a bed of powder, or by pouring or spraying the powder over the heated object. In other cases, the object may have a charge imparted thereon. Other methods disclosed hereinabove may likewise be employed.

The powder compositions of this invention may be readily pigmented with most conventional pigments, for example, iron oxides, lead oxide, strontium carbon black, titanium dioxide, talc, barium sulfate, as well as color pigments such as cadmium yellow, cadmium red, chromic yellow, phthalocyanine blue, phthalocyanine green, and the like.

To achieve special properties in the final coating, fillers may be added to the polyester prior to the reaction with the crosslinking agent. To permit better mixing, toluene, xylene or styrene may be added to the reactant mixture. When toluene is employed as the thinning agent, the mixture must be permitted to stand until the toluene has evaporated; however, when a reactive monomer is employed no removal step is necessary as it becomes a permanent part of the composition. By the addition of thinning agents, the filler powder is thoroughly wetted and a homogeneous mixture is effected. This mixture is permitted to react to form a filler-containing reaction product and which is subsequently comminuted to a homogeneous powder form ready for coating. Suitable filler powders may be selected from glass, metals, silica, asbestos, synthetic fabrics, carbon, plastics, metal oxides and the like. Chemical inertness of the filler is a prime factor to consider in selecting the filler.

When desired, various additives such as surface-active agents, wetting agents, flow agents, fungicides, and the like may be incorporated.

The pigment may be incorporated when the reaction product is pulverized; however, better uniformity and color development is obtained when the pigment is blended into the polyester resin which has been heated above its melting point. It is necessary to employ a high shear blender or mixer such as a Cowles blade in order to provide for proper grinding and dispersment of the pigment(s).

The invention is futher described in conjunction with the following examples, which are to be considered illustrative rather than limiting. All parts and percentages in the examples and throughout the specification are by weight unless otherwise stated.

Example I

A reactor vessel was charged with 255.0 parts of polyester comprising 19.3 parts neopentyl glycol, 40.9 parts hydrogenated Bisphenol A and 50.8 parts isophthalic acid having the following characteristics:

Acid value _____ 13.2
Hydroxyl value _____ 69.7
Melting point _____ °C__ 109

The polyester was heated substantially above its melting point to 160° C., then 1.5 parts of a flow agent (Modaflow) and 240.0 parts titanium dioxide were added to the liquid polyester under high shear agitation provided by a Cowles blade. After the mixture was ground for about 30 minutes, 45.0 parts of hexakis(methoxymethyl)melamine were added and the reaction was permitted to continue, under constant agitation, for 4½ mins. while the temperature was maintained at about 160° C. Generally, when a pigment grinding step is required, such grinding procedure is conducted in a separate container. After the desired reaction time, the reaction product is poured into cooling pans and subsequently the solid, brittle product was pulverized, sieved through a 150 micron mesh screen and electrostatically sprayed onto metal panels. When such films were baked at temperatures of 350° F. to 400° F. for from 12 to 20 minutes, the films provided were very smooth and were glossy in appearance.

The powder had a softening point of 82° C. and a gel time of 12 minutes. "Gel time" as defined herein means the time required, at a certain temperature, necessary in order to accelerate the reaction product to a gelled state. The temperature at which the gel times were determined was 177° C.

Example II

In this example, two polyesters (A and B) were blended in a heated stainless steel container. Added were 164.0 parts of polyester A comprised of 63.1 parts hydrogenated Bisphenol A, 6.6 parts trimethylolpropane and 50.8 parts isophthalic acid and having the following characteristics:

Acid value _____ 14.5
Hydroxyl value _____ 128.0
Melting point _____)_____ °C__ 120 and 164.0 parts of Polyester B, comprising 49.3 parts neopentyl glycol and 67.2 parts isophthalic acid, having the following characteristics:

Acid value _____ 5.5
Hydroxyl value _____ 96
Melting point _____ °C__ 68

The blend was heated to 175° C. prior to the addition of 2.0. parts of flow agent (Modaflow) and 320 parts titanium dioxide and, as in the prior example, the mixture was ground employing a high shear Cowles blade. Subsequent to obtaining a good grind 72.0 parts of hexakis-(methoxymethyl)melamine were added and the reaction was allowed to continue for an additional 7.5 minutes after which the reaction product was poured into cooling pans and immediately chilled. The resulting product, when pulverized and screened, gave a powder that had a softening point of 69° C. and a gel time of 12 minutes at 177° C. Panels which had been electrostatically sprayed with the powder herein was baked at 400° F. for 10 minutes and provided for coatings having excellent hardness, adhesion, good flow pattern and gloss.

Example III

A total of 210 parts of a polyester comprising 72.4 parts of hydrogenated Bisphenol A and 35.3 parts isophthalic acid, having the following characteristics:

Acid value _____ 18.4
Hydroxyl value _____ 79.7
Melting point _____ °C__ 120 was reacted similar to that of the prior examples. The other components employed to produce the reaction product of this example comprised 1.5 parts of flow agent (Modaflow), 210.0 parts titanium dioxide and 30.0 parts hexakis(methoxymethyl)melamine. The powder that was provided had a softening point of 98° C. and a gel time of 6 minutes at 177° C. The films produced from this example, likewise, had excellent appearance, gloss and stain resistance.

It is of interest to note that when the polyester resin and melamine resin are blended together at room temperature in a solvent and the solvent is subsequently evaporated, that the softening point is still below 65° C. and thus have limited use as powder coating compositions.

Example IV

This example employed a polyester comprised of 47.3 parts neopentyl glycol, 20.7 parts of isophthalic acid and 47.8 parts of terephthalic acid. The polyester had the following characters:

Acid value _____ 4.18
Hydroxyl value _____ 66.3
Melting point _____ °C__ 75

A total of 344 parts of said polyester were heated in a container until a molten state was obtained, then 216 parts of titanium dioxide were added and subsequently dispersed employing a Cowles blade. In addition, 2 parts of flow agent (Modaflow) and 0.1 part of P-toluenesulfonic acid were added to said container. While the contents of the container were at a temperature of about 160° C., 56 parts of hexakis(methoxymethyl)melamine were added and the mixture was allowed to react for ½ hour and then poured into cooling pans. The resultant product was brittle and had a softening point of about 68° C. and a gel time of 5½ minutes at a temperature of about 193° C.

After being pulverized and sieved said product provided a powder that when sprayed produced films having a good appearance even up to about 4.5 mils in thickness. Said powder coating was baked at 400° F. for about 10 minutes.

Example V

This example employed a polyester comprised of 16.3 parts neopentyl glycol, 4.0 parts trimethylolpropane, 38.9 hydrogenated Bisphenol A and 52 parts is a phthalic acid. The polyester had the following characteristics:

Hydroxyl value ........................... 78
Acid value ............................... 14.5
Melting point ......................° C.. 109

A total of 440 parts of said polyester were heated in a container until a molten state was obtained, then 270 parts titanium dioxide were added and dispersed employing a Cowles blade. In addition, 2.5 parts of a flow agent (Modaflow) and 60 parts hexakis(methoxymethyl)melamine were added to said container and the reaction was permitted to continue for about 3 minutes at 170° C., subsequently the product was poured into a cooling pan. The product had a softening point of 78° C. and a gel time of 7 minutes at 193° C.

After this product was pulverized and sieved said product provided a powder that when electrostatically sprayed onto metal panels and baked at 400° F. for 10 minutes, produced films that showed a good appearance and gloss up to thickness for 5 mils. Also the films had excellent adhesion to bare metal as well as good stain resistance.

In addition to the above reactants, various other polyesters and modified polyesters may be employed with equally desirable results. Also, other crosslinking resins such as hexylated methylated methylolmelamine and ethoxymethoxymethyl melamine, as well as monomeric benzylurea and benzoquanamine, and the like, may be readily employed to replace the hexakis(methoxymethyl) melamine. The reaction may in some instances be conducted in the presence of a solvent such as xylene, toluene, or the like, and sprayed dried to provide powders that can produce suitable coatings. Likewise, pigments in addition to titanium dioxide such as iron oxide, chromic yellow, phthalocyanine blue, or the like, may be utilized to provide for a particular decorative coating. Methods other than electrostatic spray may be employed, for example, fluidized bed, electrostatic fluidized bed, and flock (air gun) are also suitable methods for powder applications.

According to the provisions of the patent statutes, there are described above the invention and what are now considered to be its best embodiments; however, within the scope of the appended claims, it is to be understood that the invention can be practiced otherwise than as specifically described.

We claim:

1. A coating composition in powder form comprising a heat fusible reaction product having a softening point of at least 65° C. comprised of:
   (a) a polyester resin comprising a reaction product of a polyhydric alcohol and a polybasic acid; and
   (b) an amine-aldehyde resin.

2. A composition as in claim 1 wherein said reaction product is pigmented.

3. A composition as in claim 1 wherein said reaction product is comprised of from about 1 to about 50 percent by weight of an amine-aldehyde resin.

4. A composition as in claim 1 wherein said polyester resin is a member of the class consisting of polyesters, oil-modified polyesters, and amide modified oil-free polyesters.

5. A composition as in claim 1 wherein said amine-aldehyde resin is an aldehyde condensation product of melamine, urea or benzoguanamine.

6. A method of producing a powder pigmented coating composition comprising the steps of:
   (a) heating a polyester resin to molten state said polyester comprising a reaction product of a polyhydric alcohol and a polybasic acid;
   (b) adding a pigment to said molten polyester;
   (c) dispersing said pigment in said molten polyester;
   (d) adding an amine-aldehyde resin to pigmented molten polyester;
   (e) reacting polyester resin and amine-aldehyde resin until resultant reaction product has a softening point of at least 65° C.;
   (f) cooling and pulverizing said reaction product; and said pulverized reaction product being fusible when heated.

7. A method as in claim 6 wherein said pigment is titanium dioxide.

8. A method as in claim 6 wherein said reaction product is comprised of from about 1 to about 50 percent by weight of an amine-aldehyde resin.

9. A method as in claim 6 wherein said polyester resin is a member of the class consisting of polyesters, oil-modified polyesters, and amide modified oil-free polyesters.

10. A method as in claim 6 wherein said amine-aldehyde resin is an aldehyde condensation product of melamine, urea or benzoguanamine.

References Cited
UNITED STATES PATENTS
3,624,232  11/1971  Van Dorp ........... 117—21
3,211,695  10/1965  Peterson ........... 117—21

DONALD E. CZAJA, Primary Examiner

R. W. GRIFFIN, Assistant Examiner

U.S. Cl. X.R.

117—21, 132 BF, 161 LN, 161 K; 260—39 M, 850